Patented Oct. 8, 1935

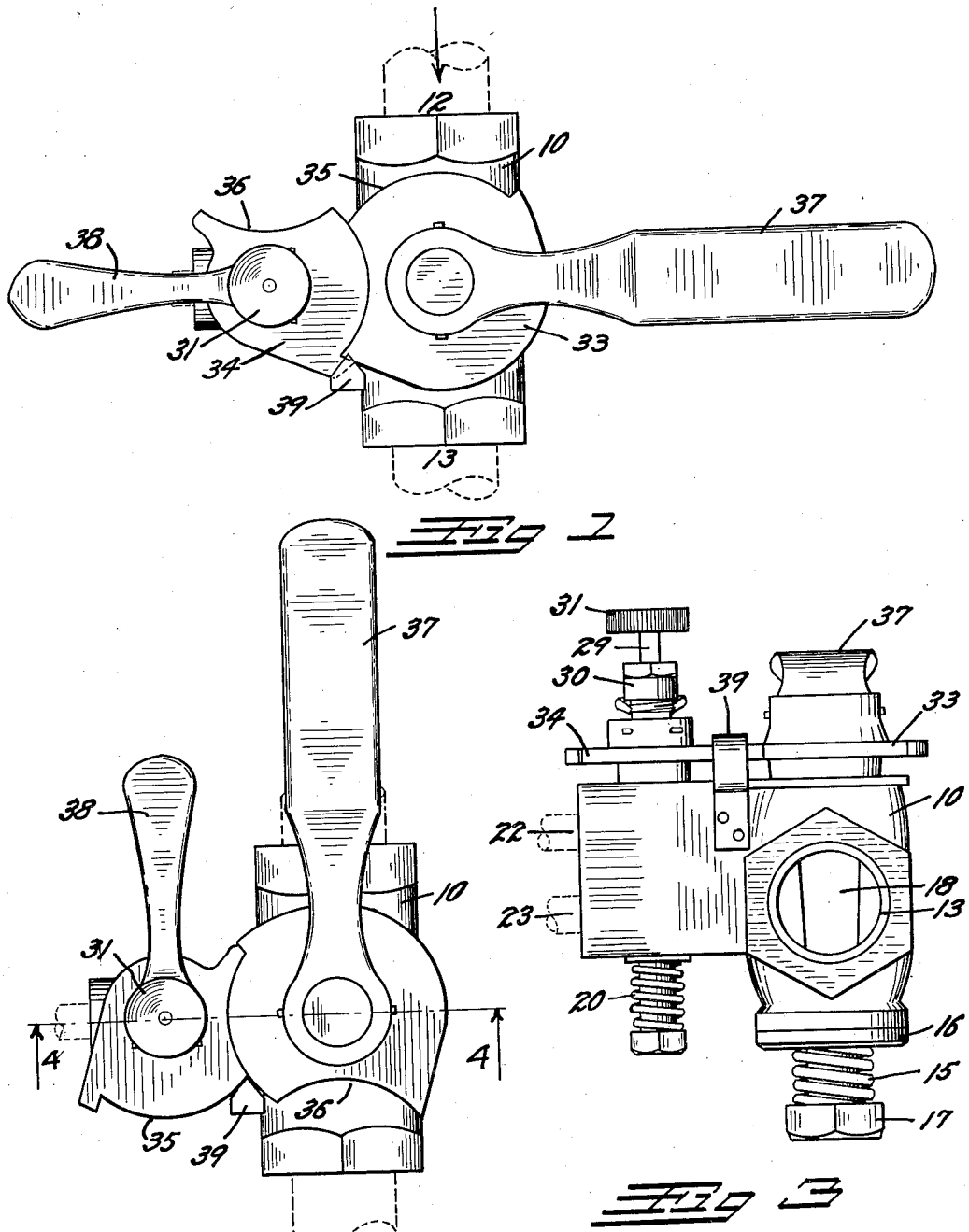

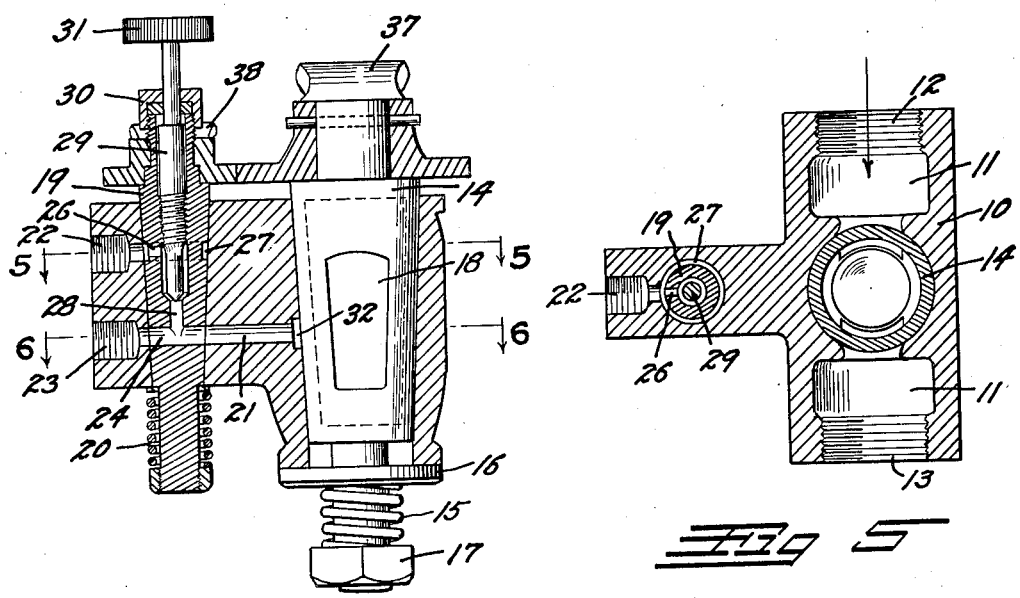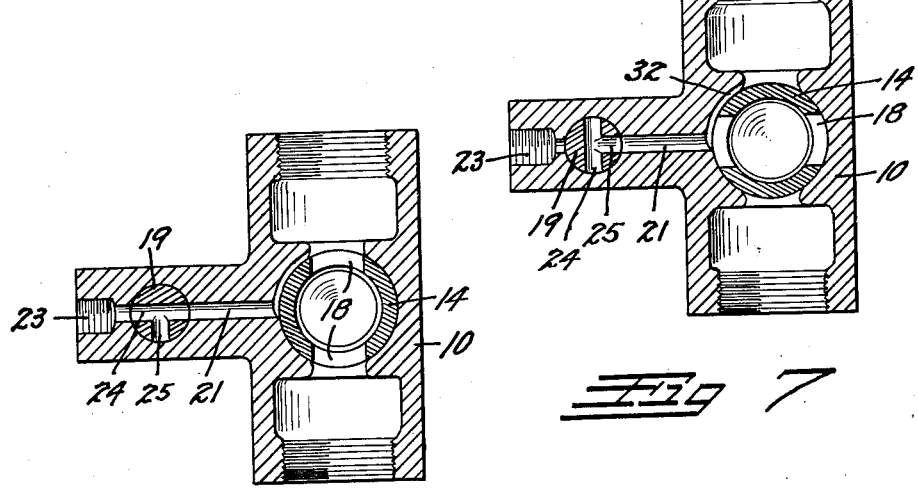

2,016,577

UNITED STATES PATENT OFFICE 2,016,577

GAS HEATER VALVE

Carl A. Pearson, Denver, Colo.

Application November 26, 1934, Serial No. 754,736

4 Claims. (Cl. 277—19)

This invention relates to a supply valve for gas heating equipment. The principal object of the invention is to provide a composite valve for controlling the gas supply to an automatic lighter; a pilot light; and a main burner, so that a predetermined sequence of operations must be carried out in controlling the pilot light and the main burner; and so that the supply to the automatic lighter can be controlled entirely independent of the pilot and main supplies.

Another object of the invention is to provide a construction by means of which the lighter supply can be turned off at any time without affecting the pilot and main supplies, yet which will also automatically turn off the lighter supply when both the main and pilot supplies are turned off.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a front view of the improved valve in the fully "off" position.

Fig. 2 is a similar view illustrating the valve in the fully "on" position.

Fig. 3 is an end view looking toward the discharge end of the valve.

Fig. 4 is a cross section through the valve taken on the line 4—4, Fig. 2.

Fig. 5 is a horizontal section through the valve taken on the line 5—5, Fig. 4.

Fig. 6 is a similar section taken on the line 6—6, Fig. 4.

Fig. 7 is a similar section, illustrating the valve in the "off" position of Fig. 1.

The invention comprises a valve body 10 having a main passage 11 extending therethrough, terminating in an intake nipple 12 and a discharge nipple 13. A main valve plug 14 is interposed in the passage 11. The valve plug 14 comprises a hollow, tapered plug fitted into a tapered bore in the housing 10 and maintained snug therein by means of a compression spring 15. The compression spring 15 acts between a spring washer 16 and an adjusting nut 17. The hollow body of the valve plug 14 is provided with opposite openings which form a main valve port 18 through the plug 14.

A secondary valve plug 19 is positioned adjacent and parallel to the main valve plug 14. This is also a tapered plug maintained in place by means of a suitable compression spring 20. A lateral passage 21 communicates between the main valve plug 14 and the secondary valve plug 19. The latter plug controls the flow to a lighter outlet 22 and a pilot outlet 23.

The secondary valve plug 19 is formed with a T-shaped pilot port 24 which extends diametrically through the valve and is provided with a side outlet 25 positioned at right angles to the main port. Above this, is a lighter port 26 which opens to a peripheral groove 27 surrounding the stem 19 opposite the lighter outlet 22. A vertical passage 28 extends axially through the stem 19 from the pilot port 24 to the lighter port 26.

The passage 28 is provided with a needle valve seat which can be closed by means of a threaded needle valve 29. The needle valve 29 extends upwardly through the valve stem 19, sealed by a stuffing gland 30, and terminates in a finger disc 31.

The lateral passage 21 terminates at the main valve plug 14 in a by-pass groove 32 which forms a continuously open passage from the intake nipple 12 to the lateral passage 21.

The main valve plug 14 is provided with an interlocking disc 33 and the secondary valve plug 19 is provided with an interlocking disc 34. These discs contain arcuate sides 35 which interfit into arcuate indentations 36 of the opposing discs, so that, the main valve plug can not be turned until the secondary valve plug has been opened, and the secondary valve plug can not be closed until the main valve plug has been closed. These discs and their operation are described more in detail in applicant's Patent No. 1,898,569 and in copending application, Serial No. 754,735.

The main and secondary valve plugs 14 and 19 are provided with a suitable main and secondary operating handles 37 and 38, respectively. An indicating pointer 39 is provided to indicate the valve positions according to suitable notations upon the interlocking discs.

Operation

Let us assume that the valve is in the completely "off" position of Fig. 1, and that it is desired to start the burner to which the valve is connected. It will be noted that it is impossible to move the handle 37 since its disc 33 is locked to the disc 34. Therefore the secondary valve plug must first be opened.

When the secondary valve has been turned to the "on" position of Fig. 2, the passages therein will be in the position of Fig. 4, so that gas may flow through the bypass groove 32, the lateral passage 21, and the pilot port 24, to the pilot outlet 23. If the needle valve 29 is open, gas may also flow upwardly through the vertical passage 28 and the lighter port 26, to the lighter outlet 22. Thus both the lighter and pilot will be started.

The lighter can now be closed, if desired, by means of the needle valve 31, which acts to close the passage 28. The main valve 14 can now be turned to the "on" position of Fig. 2, allowing gas to flow to the main burner which will be ignited by the burning pilot light.

It will be noted that the pilot supply cannot be shut off until the main burner is shut off, owing to the fact that its interlocking disc 34 is locked to the side of the disc 33, as shown in Fig. 2. The lighter, however, can be closed or opened at any time, by means of the independent needle valve 31.

Should it be desired to shut down the complete installation, both valves are returned to the position of Fig. 1, the main valve being, of necessity, turned first. When in this position, the valve plugs are in the position indicated in Fig. 7, so that gas is shut off from both the pilot and the lighter.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A composite gas burner control valve comprising: a valve body; a main valve plug in said body; said main valve controlling a main passage; a secondary valve plug in said body adjacent and parallel to said main valve plug, said secondary plug controlling a lighter and a pilot outlet; a lateral passage communicating between said main and secondary plugs; a pilot port extending diametrically through said secondary plug between said lateral passage and said pilot outlet; a lighter port extending from said secondary plug to said lighter outlet; a passage in said plug between said pilot port and said lighter port; and a needle valve within said plug controlling said latter passage, said lateral passage communicating with said main passage uncontrolled by said main plug.

2. A control valve for gas heaters comprising: a valve body having a main passage extending longitudinally therethrough; a main plug valve seat in said main passage; a pilot passage extending outwardly through said body from said main plug valve seat; a secondary plug valve seat in said pilot passage; a main valve in said main valve seat; a secondary valve in said secondary plug valve seat, said two valves being parallel to each other; a lighter passage extending from said secondary valve parallel to said pilot passage; a by-pass passage connecting said pilot passage with said main passage around said main valve; a first port continuing said pilot passage through said secondary valve; a central bore in said secondary valve communicating with said first port; a second port extending outward from said bore to register with said lighter passage; and a needle valve extending into said bore past said second port to control the flow from said first to second ports.

3. A control valve for gas heaters comprising: a valve body having a main passage extending longitudinally therethrough; a main plug valve seat in said main passage; a pilot passage extending outwardly through said body from said main plug valve seat; a secondary plug valve seat in said pilot passage; a main valve in said main valve seat; a secondary valve in said secondary plug valve seat, said two valves being parallel to each other; a lighter passage extending from said secondary valve parallel to said pilot passage; a by-pass passage connecting said pilot passage with said main passage around said main valve; a first port continuing said pilot passage through said secondary valve; a central bore in said secondary valve communicating with said first port; a second port extending outward from said bore to register with said lighter passage; a needle valve extending into said bore past said second port to control the flow from said first to second ports; and a by-pass groove communicating with said second port so that the latter will always remain open to said lighter passage.

4. A control valve for gas heaters comprising: a valve body having a main passage extending longitudinally therethrough; a main plug valve seat in said main passage; a pilot passage extending outwardly through said body from said main plug valve seat; a secondary plug valve seat in said pilot passage; a main valve in said main valve seat; a secondary valve in said secondary plug valve seat, said two valves being parallel to plug valve seat, said two valves being parallel to each other; a lighter passage extending from said secondary valve parallel to said pilot passage; a by-pass passage connecting said pilot passage with said main passage around said main valve; a first port continuing said pilot passage through said secondary valve; a central bore in said secondary valve communicating with said first port; a second port extending outward from said bore to register with said lighter passage; a needle valve extending into said bore past said second port to control the flow from said first to second ports; a by-pass groove communicating with said second port so that the latter will always remain open to said lighter passage; and a lateral port extending from said first port to a point on said secondary valve to register with said pilot passage so that by rotation of said secondary valve said bore and second port may both be closed from said pilot passage, or both opened thereto, or said second port may be closed while said bore remains open thereto.

CARL A. PEARSON.